(12) United States Patent
Kim

(10) Patent No.: US 8,688,347 B2
(45) Date of Patent: Apr. 1, 2014

(54) APPARATUS AND METHOD OF ADJUSTING CLEARANCE OF ELECTRONIC BRAKE

(75) Inventor: Myoung June Kim, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 686 days.

(21) Appl. No.: 12/879,451

(22) Filed: Sep. 10, 2010

(65) Prior Publication Data

US 2011/0066346 A1 Mar. 17, 2011

(30) Foreign Application Priority Data

Sep. 15, 2009 (KR) ........................ 10-2009-0087110

(51) Int. Cl.
*G05D 1/00* (2006.01)
*G06F 7/70* (2006.01)

(52) U.S. Cl.
USPC .............................................. 701/74; 701/70

(58) Field of Classification Search
USPC ........ 701/70, 74; 188/1.011 E, 1.11 L, 106 F, 188/162, 196 B, 196 D, 196 M, 196 P
See application file for complete search history.

(56) References Cited

U.S. PATENT DOCUMENTS

| | | | | |
|---|---|---|---|---|
| 6,412,882 | B1 * | 7/2002 | Isono et al. | 303/114.1 |
| 2001/0033106 | A1 * | 10/2001 | Shirai et al. | 303/177 |
| 2003/0125863 | A1 * | 7/2003 | Tamasho et al. | 701/70 |
| 2006/0022518 | A1 * | 2/2006 | Manaka et al. | 303/122 |
| 2006/0091728 | A1 * | 5/2006 | Fulks et al. | 303/193 |
| 2006/0163940 | A1 * | 7/2006 | Alvarez et al. | 303/146 |
| 2007/0235268 | A1 | 10/2007 | Caron | |
| 2008/0255732 | A1 * | 10/2008 | Yasui et al. | 701/48 |
| 2009/0218179 | A1 * | 9/2009 | Yokoyama et al. | 188/1.11 L |

FOREIGN PATENT DOCUMENTS

| | | |
|---|---|---|
| JP | 2002-266907 | 9/2002 |
| JP | 2005247306 A | 9/2005 |
| JP | 2008-051257 | 3/2008 |
| KR | 100785338 B1 | 12/2007 |

OTHER PUBLICATIONS

Chinese Office Action, and English translation thereof, issued in Chinese Patent Application No. 201010278258.X dated Aug. 15, 2012.
Korean Office Action issued in Korean Patent Application No. 10-2009-0087110 mailed Jul. 30, 2013.

* cited by examiner

*Primary Examiner* — Ian Jen
(74) *Attorney, Agent, or Firm* — McDermott Will & Emery LLP

(57) ABSTRACT

Disclosed herein are an apparatus and method of adjusting a clearance of an electronic brake, in which a clearance between a pad and a rotor is appropriately adjusted according to a vehicle traveling situation. If the entry condition of a clearance adjustment section during stoppage is satisfied, clearance adjustment is performed to move pads of an electronic brake away from a rotor by a rearward-movement adjustment distance during stoppage, enabling rapid braking-release so as not to prevent a driver from starting a vehicle due to brake failure. In addition, if the entry condition of a clearance adjustment section during traveling is satisfied, clearance adjustment is performed to move the pads forward or rearward according to a wheel slip value. The clearance adjustment during traveling is limited to the case of straight traveling, to prevent misjudgment due to wheel slip caused during cornering.

6 Claims, 3 Drawing Sheets

APPARATUS AND METHOD OF ADJUSTING CLEARANCE OF ELECTRONIC BRAKE

CROSS-REFERENCE TO RELATED APPLICATION

This application claims the benefit of Korean Patent Application No. 2009-0087110, filed on Sep. 15, 2009 in the Korean Intellectual Property Office, the disclosure of which is incorporated herein by reference.

BACKGROUND

1. Field

Embodiments of the present invention relate to an apparatus and method of adjusting a clearance of an electronic brake, in which a clearance between a pad and a rotor may be appropriately adjusted according to vehicular traveling conditions.

2. Description of the Related Art

Recently, technologies to install an electronic brake, driven by an electric motor, in a vehicle to exhibit rapid and easy vehicle braking have been developed.

An electronic brake includes a rotor located between an inner pad and an outer pad, and generates brake force by moving the pads using a motor. Since braking performance may be obtained only when a clearance between each pad and the rotor is appropriately adjusted, there is a serious demand for a clearance adjusting method suitable for a traveling situation.

SUMMARY

Therefore, it is an aspect of the present invention to provide an apparatus and method of adjusting a clearance of an electronic brake, in which a clearance between a pad and a rotor may be appropriately adjusted under a stoppage or traveling situation.

Additional aspects of the invention will be set forth in part in the description which follows and, in part, will be obvious from the description, or may be learned by practice of the invention.

In accordance with one aspect of the present invention, an electronic brake clearance adjusting apparatus includes an electronic brake including a pad and a rotor to generate brake force, a pad moving unit to move the pad, and an electronic brake control unit to determine each adjustment section to adjust a clearance between the pad and the rotor using information collected via sensors mounted in a vehicle and to control the pad moving unit to adjust the clearance by a preset adjustment distance if the condition of the corresponding clearance adjustment section is satisfied.

The electronic brake may include an engine throttle valve, an engine output sensor, a brake pedal sensor, an accelerator and a wheel velocity sensor, and the electronic brake control unit may determine an entry condition during stoppage based on the supply amount of fuel, revolutions per minute of an engine, operation of a brake pedal, acceleration mode, and vehicle velocity, and if the vehicle velocity is a predetermined level or more and the vehicle performs straight traveling, may determine an entry condition during traveling by calculating a wheel slip value.

In accordance with another aspect of the present invention, an electronic brake clearance adjusting method includes determining stoppage or traveling of a vehicle based on information collected via sensors mounted in the vehicle, determining a clearance adjustment section during stoppage or a clearance adjustment section during traveling based on the determined stoppage or traveling result, and adjusting a clearance by moving a pad by a preset adjustment distance corresponding to the determined clearance adjustment section.

The pad may be moved rearward by a preset adjustment distance during stoppage if an entry condition of the clearance adjustment section during stoppage is satisfied.

The entry condition of the clearance adjustment section during stoppage may be satisfied if the supply amount of fuel is a predetermined level or more, revolutions per minute of an engine is a predetermined level or more, a transmission mode is set to a traveling mode without operation of a brake pedal, and a vehicle velocity is a predetermined level or less.

The wheel slip value may be calculated if an entry condition of the clearance adjustment section during traveling is satisfied, and the clearance adjustment may be divided according to the calculated slip value into a rearward-movement section to move the pad rearward and a forward-movement section to move the pad forward.

A count value for rearward-movement section may be increased by a value (obtained by subtracting a current slip value from the second slip limit value) on a per control cycle basis, and the pad may be moved rearward by a rearward-movement distance if the count value reaches a limit value.

A count value for forward-movement section may be increased one by one on a per control cycle basis, and the pad may be moved forward by a forward-movement distance if the count value reaches a limit value.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
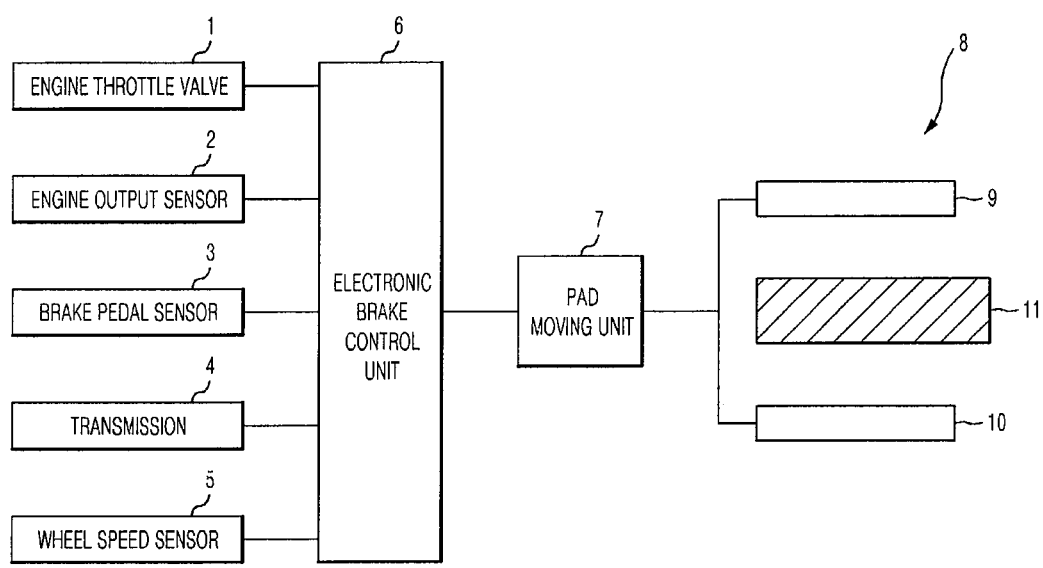
FIG. 1 is a control block diagram illustrating an electronic brake clearance adjusting apparatus in accordance with an embodiment of the present invention.

Reference will now be made in detail to the embodiments of the present invention, examples of which are illustrated in the accompanying drawings, wherein like reference numerals refer to like elements throughout.

Hereinafter, an electronic brake clearance adjusting apparatus and method in accordance with an embodiment of the present invention will be described.

Figure 2:
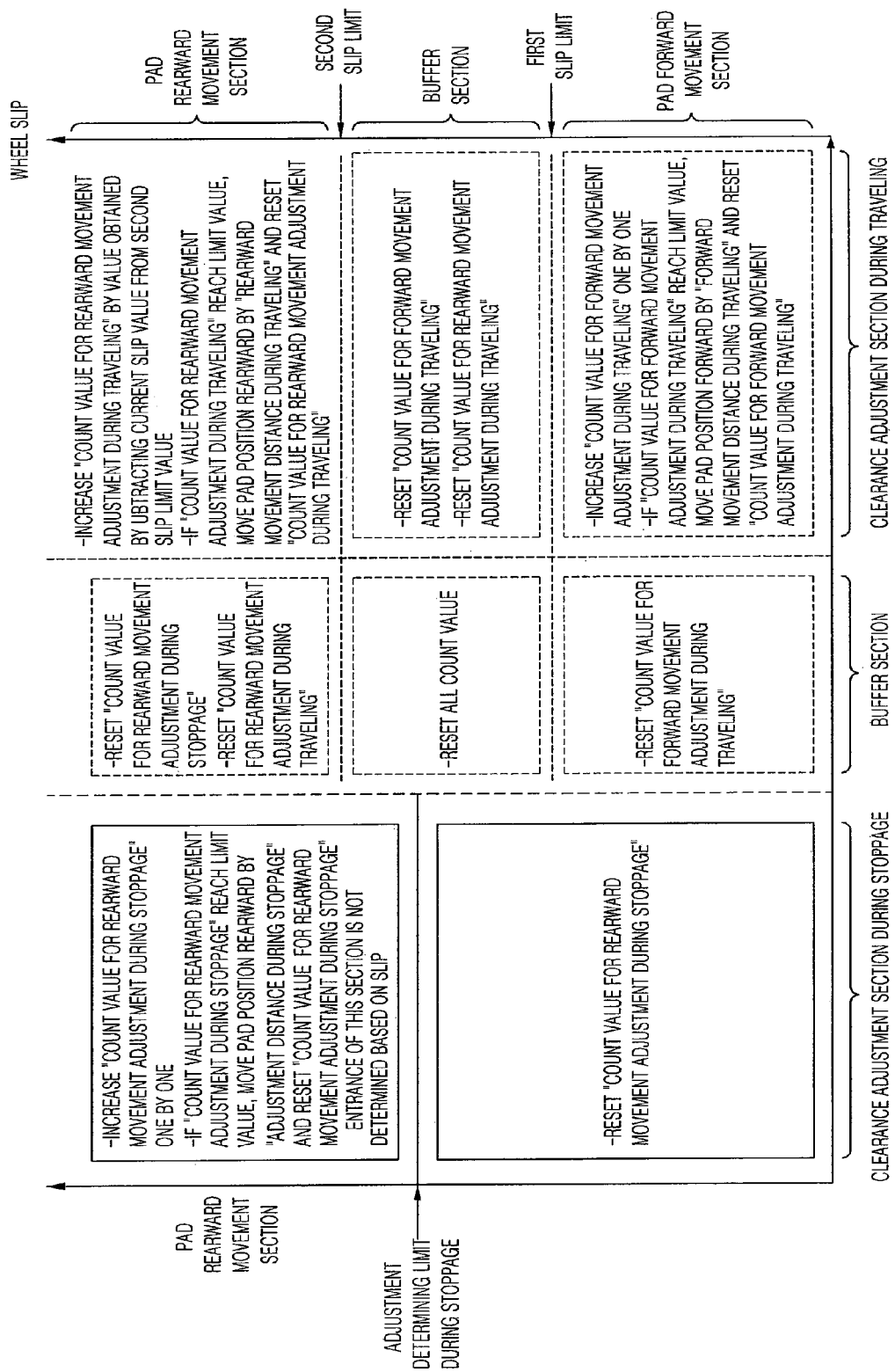
FIG. 2 is a table illustrating an electronic brake clearance adjusting pattern with respect to respective adjustment modes in accordance with an embodiment of the present invention.
Figure 3:
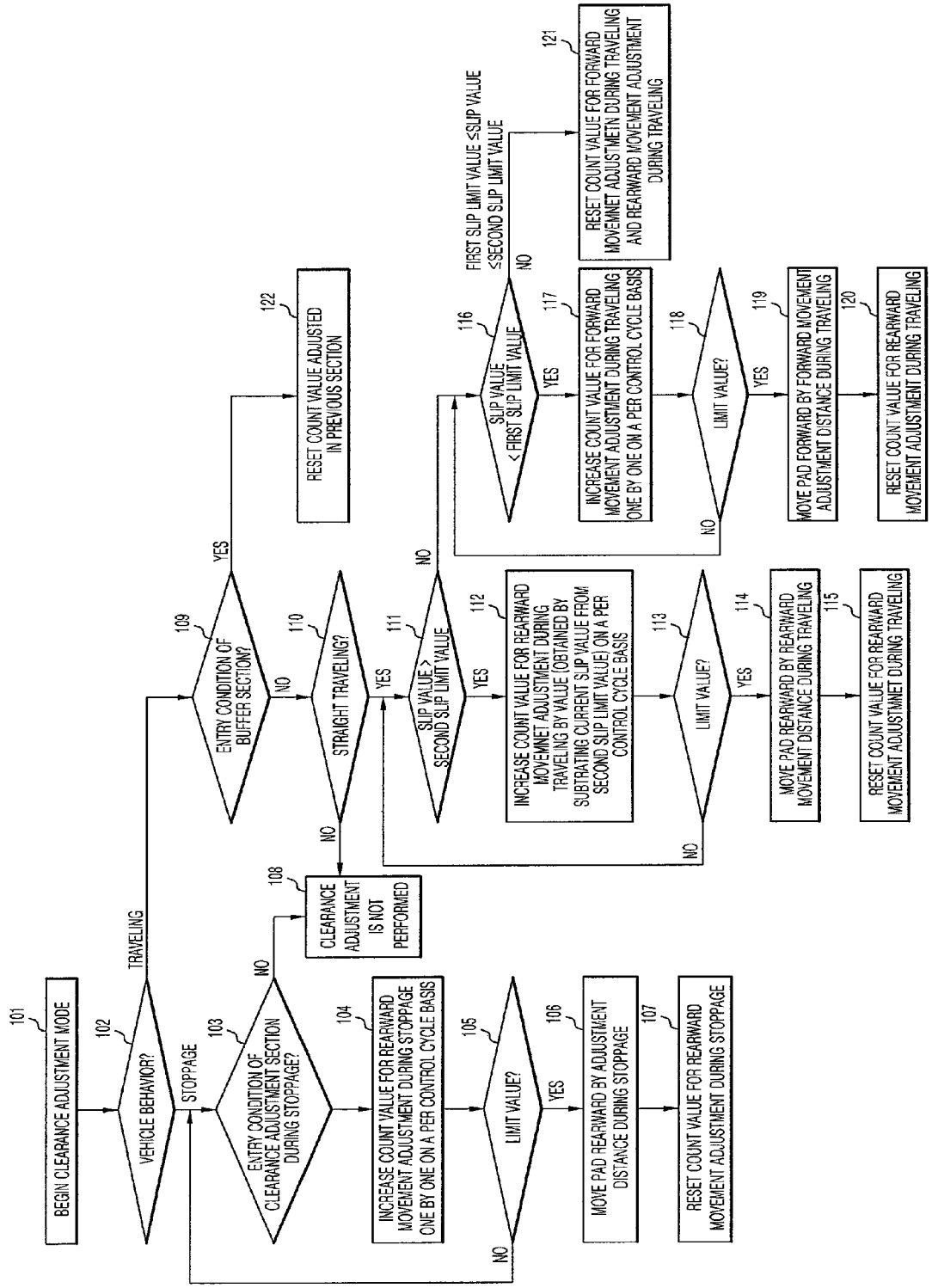
FIG. 3 is a flow chart illustrating an electronic brake clearance adjusting method in accordance with an embodiment of the present invention.

FIG. 1 is a control block diagram illustrating the electronic brake clearance adjusting apparatus in accordance with the embodiment of the present invention, and FIG. 2 is a table illustrating an electronic brake clearance adjusting pattern with respect to respective adjustment modes in accordance with an embodiment of the present invention.

As illustrated, the electronic brake clearance adjusting apparatus includes an electronic brake control unit 6 to control clearance adjustment of an electronic brake 8.

The electronic brake 8 includes an inner pad 9, outer pad 10, and rotor 11. The inner and outer pads 9 and 10 may be moved by a pad moving unit 7. The pad moving unit 7 may be an electric motor.

The clearance adjustment may be performed by adjusting a distance between each pad and the rotor. The pad moving unit 7 moves the pads according to a clearance adjustment signal from the electronic brake control unit 6. The clearance adjustment may be divided into forward-movement adjustment to move the pads toward the rotor, and rearward-movement adjustment to move the pads away from the rotor.

In addition, the clearance adjustment may be divided, according to a clearance adjustment time, into a clearance adjustment section during stoppage, clearance adjustment section during traveling, and buffer section between the above two sections, in which clearance adjustment is not performed.

Clearance adjustment during traveling is limited to the case of straight traveling, to eliminate inappropriate clearance adjustment due to wheel slip caused during cornering.

The electronic brake control unit 6 is electrically connected to an engine throttle valve 1, engine output sensor 2, brake pedal sensor 3, transmission 4 and wheel speed sensor 5. In this way, the electronic brake control unit 6 may select a clearance adjustment beginning time and clearance adjusting method based on collected information, such as the supply amount of fuel, Revolutions Per Minute (RPM) of an engine, operation of a brake pedal, vehicular behavior including a transmission mode, vehicle velocity and the like.

Referring to FIG. 2, the clearance adjustment is divided, on the basis of a vehicle velocity, into a clearance adjustment section during stoppage, buffer section and clearance adjustment section during traveling, and also, on the basis of pad movement, into a pad rearward-movement section, buffer section and pad forward-movement section.

The electronic brake control unit 6 determines whether or not a current condition corresponds to the entry condition of "the clearance adjustment section during stoppage". If the current condition corresponds to the entry condition, the electronic brake control unit 6 outputs a clearance adjustment initiation signal to the pad moving unit 7. At this time, wheel slip is slight and thus, the entry condition is determined based on vehicle behavior. For example, it is determined that the entry condition of "the clearance adjustment section during stoppage" is satisfied if the supply amount of fuel is a predetermined level or more, the RPM of the engine is a predetermined level or more, a transmission mode is set to a traveling mode without operation of the brake pedal, and a vehicle velocity is a predetermined level or less.

If the entry condition of "the clearance adjustment section during stoppage" is satisfied, the electronic brake control unit 6 cumulatively increases "a count value for rearward-movement adjustment during stoppage" one by one on a per control cycle basis. If the accumulated count value reaches a preset limit value, a position of the pad is moved rearward by "a preset adjustment distance during stoppage". Then, "the count value for rearward-movement adjustment during stoppage" is reset.

A situation requiring clearance adjustment during stoppage, for example, is a situation in which the brake is abnormally operated to prevent a driver from starting a vehicle. To eliminate this situation, i.e. to enable rapid braking-release, "the adjustment distance during stoppage" is set to be greater than "an adjustment distance during traveling" that will be described hereinafter.

If the vehicle is accelerated into a traveling mode, the electronic brake control unit 6 determines whether or not a current condition corresponds to the entry condition of "the clearance adjustment section during traveling". The entry condition of "the clearance adjustment section during traveling" is determined in consideration of a wheel slip value under the assumption that the buffer section ends and the vehicle begins straight traveling. If the wheel slip value is greater than the second slip limit value (the first slip limit value<the second slip limit value), "the rearward-movement section during traveling" to move the pads away from the rotor begins. If the wheel slip value is smaller than the first slip limit value, "the forward-movement section during traveling" to move the pads toward the rotor begins.

If "the rearward-movement section during traveling" begins, the electronic brake control unit 6 cumulatively increases "a count value for rearward-movement adjustment during traveling" by a certain value (obtained by subtracting a current slip value from the second slip limit value) on a per control cycle basis. If the accumulated count value reaches a preset limit value, the pads are moved away from the rotor by "a preset rearward-movement distance during traveling". Then, "the count value for rearward-movement adjustment during traveling" is reset. In consideration of a situation having a need for pad rearward-movement during traveling, for example, a residual drag situation, it may be necessary to adjust a clearance earlier than "the forward-movement section during traveling" that will be described hereinafter. Therefore, the electronic brake control unit 6 increases the count value by a certain value (obtained by subtracting a current slip value from the second slip limit value).

If the wheel slip value is smaller than the first slip limit value, "the forward-movement section during traveling" to move the pads toward the rotor begins. If "the forward movement section during traveling" begins, "a count value for forward-movement adjustment during traveling" is cumulatively increased one by one on a per control cycle basis. If the accumulated count value reaches a preset limit value, the pads are moved toward the rotor by "a preset forward-movement distance during traveling". Then, "the count value for forward-movement adjustment during traveling" is reset.

While the clearance adjustment is performed by moving the pads during stoppage or traveling of the vehicle, all the count values are not changed because pad movement for clearance adjustment may be misjudged as wheel slip.

If the buffer section in which the wheel slip value is greater than the first slip limit value and smaller than the second slip limit value begins, both "the count value for forward-movement adjustment during traveling" and "the count value for rearward-movement adjustment during traveling" are reset.

In the buffer section not corresponding to both "the clearance adjustment section during stoppage" and "the clearance adjustment section during traveling" on the basis of the vehicle velocity, as illustrated in FIG. 2, each count value changed in the previous clearance adjustment section is reset.

Hereinafter, the electronic brake clearance adjusting method in accordance with the embodiment of the present invention will be described with reference to the accompanying drawings.

If a clearance adjustment mode to adjust the clearance of the electronic brake 8 begins (101), the electronic brake control unit 6 determines vehicle behavior, vehicle velocity and the entry conditions of the respective sections based on information collected from the engine throttle valve 1, engine output sensor 2, brake pedal sensor 3, transmission 4 and wheel velocity sensor 5 (102).

If the vehicle behavior is determined as stoppage, it is determined whether or not the entry condition of "the clearance adjustment section during stoppage" is satisfied. The entry condition of "the clearance adjustment section during stoppage" is satisfied if the supply amount of fuel is a predetermined level or more, the RPM of the engine is a predetermined level or more, a transmission mode is set to a traveling mode without operation of the brake pedal, and a vehicle velocity is a predetermined level or less.

If the entry condition of "the clearance adjustment section during stoppage" is satisfied (if the result of operation 103 is Yes), "the count value for rearward-movement adjustment during stoppage" is cumulatively increased one by one on a per control cycle basis (104). If the accumulated count value reaches a limit value (if the result of operation 105 is Yes), the electronic brake control unit 6 sends a clearance adjustment signal to the pad moving unit 7 to move the pads 9 and 10 away from the rotor by "the adjustment distance during stoppage" (106). Then, "the count value for rearward-movement adjustment during stoppage" is reset (107).

If the entry condition of the clearance adjustment section during stoppage" is not satisfied, clearance adjustment is not performed (108).

If the vehicle is accelerated and thus, the vehicle behavior is determined as traveling, it is determined whether or not a current situation corresponds to the buffer section on the basis of the vehicle velocity. If the current situation does not correspond to the buffer section (if the result of operation 109 is No), it is determined whether or not the vehicle performs straight traveling. If the vehicle performs cornering (if the result of operation 110 is No), clearance adjustment is not performed.

If the straight traveling is determined (if the result of operation 110 is Yes), the wheel slip value is calculated. If the calculated wheel slip value is greater than the second slip limit value (if the result of operation 111 is Yes), the count value for rearward-movement adjustment during traveling" is cumulatively increased by a certain value (obtained by subtracting a current slip value from the second slip limit value) on a per control cycle basis (112). If the accumulated count value reaches a preset limit value (if the result of operation 113 is Yes), the electronic brake control unit 6 sends a clearance adjustment signal to the pad moving unit 7 to move the pads 9 and 10 away from the rotor by "the rearward-movement distance during traveling" (114). Then, "the count value for rearward-movement adjustment during traveling" is reset (115).

If the straight traveling is determined and the calculated slip value is smaller than the preset first slip limit value (if the result of operation 116 is Yes), "the count value for forward-movement adjustment during traveling" is cumulatively increased one by one on a per control cycle basis (117). If the accumulated count value reaches a preset limit value (if the result of operation 118 is Yes), the electronic brake control unit 6 sends a clearance adjustment signal to the pad moving unit 7 to move the pads 9 and 10 toward the rotor by "the forward-movement distance during traveling" (119). Then, "the count value for forward-movement adjustment during traveling" is reset (120).

If the current situation corresponds to a buffer section that is set on the basis of the slip value, i.e. if the current slip value is equal to or greater than the first slip limit value and is equal to or smaller than the second slip limit value (if the result of operation 116 is No), both "the count value for forward-movement adjustment during traveling" and "the count value for rearward-adjustment during traveling" are reset (121).

If the current situation corresponds to the buffer section on the basis of vehicle velocity, as illustrated in FIG. 2, each count value adjusted in the previous clearance adjustment section is reset (122).

As is apparent from the above description, in an electronic brake clearance adjusting apparatus and method according to an embodiment of the present invention, if the entry condition of a clearance adjustment section during stoppage is satisfied, clearance adjustment is performed to move pads of an electronic brake away from a rotor by a rearward-movement adjustment distance during stoppage, enabling rapid braking-release so as not to prevent a driver from starting a vehicle due to brake failure.

In addition, if the entry condition of a clearance adjustment section during traveling is satisfied, clearance adjustment is performed to move the pads forward or rearward according to a wheel slip value. The clearance adjustment during traveling is limited to the case of straight traveling, to prevent misjudgment due to wheel slip caused during cornering.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic brake clearance adjusting apparatus comprising:
    an electronic brake including a pad and a rotor to generate brake force;
    a pad moving unit to move the pad; and
    an electronic brake control unit to determine stoppage or traveling of a vehicle and each adjustment section to adjust a clearance between the pad and the rotor using information collected via sensors mounted in a vehicle, and to control the pad moving unit to adjust the clearance in response to the determined stoppage or traveling result by a preset adjustment distance if a condition of a corresponding clearance adjustment section is satisfied,
    wherein:
    the electronic brake includes an engine throttle valve, an engine output sensor, a brake pedal sensor, an accelerator and a wheel velocity sensor, and
    the electronic brake control unit determines an entry condition during stoppage based on a supply amount of fuel, revolutions per minute of an engine, operation of a brake pedal, acceleration mode, and vehicle velocity, and if the vehicle velocity is a predetermined level or more and the vehicle performs straight traveling, determines the entry condition during traveling by calculating a wheel slip value.

2. An electronic brake clearance adjusting method comprising:
    determining stoppage or traveling of a vehicle based on information collected via sensors mounted in the vehicle;
    determining a clearance adjustment section during stoppage or a clearance adjustment section during traveling based on the determined stoppage or traveling result; and
    adjusting a clearance in response to the determined stoppage or traveling result by moving a pad by a preset adjustment distance corresponding to the determined clearance adjustment section,
    wherein the pad is moved rearward by a preset adjustment distance during stoppage if an entry condition of the clearance adjustment section during stoppage is satisfied.

3. The method according to claim 2, wherein the entry condition of the clearance adjustment section during stoppage is satisfied if the supply amount of fuel is a predetermined level or more, revolutions per minute of an engine is a predetermined level or more, a transmission mode is set to a traveling mode without operation of a brake pedal, and a vehicle velocity is a predetermined level or less.

4. An electronic brake clearance adjusting method comprising:

determining stoppage or traveling of a vehicle based on information collected via sensors mounted in the vehicle;

determining a clearance adjustment section during stoppage or a clearance adjustment section during traveling based on the determined stoppage or traveling result; and adjusting a clearance in response to the determined stoppage or traveling result by moving a pad by a preset adjustment distance corresponding to the determined clearance adjustment section, wherein the wheel slip value is calculated if an entry condition of the clearance adjustment section during traveling is satisfied, and the clearance adjustment is divided according to the calculated slip value into a rearward-movement section to move the pad rearward and a forward-movement section to move the pad forward.

5. The method according to claim 4, wherein a count value for rearward-movement section is increased by a value (obtained by subtracting a current slip value from the second slip limit value) on a per control cycle basis, and the pad is moved rearward by a rearward-movement distance if the count value reaches a limit value.

6. The method according to claim 4, wherein a count value for forward-movement section is increased one by one on a per control cycle basis, and the pad is moved forward by a forward-movement distance if the count value reaches a limit value.

* * * * *